(12) United States Patent
Schmid et al.

(10) Patent No.: US 8,511,821 B2
(45) Date of Patent: Aug. 20, 2013

(54) EYE MODEL FOR USE IN OPHTHALMOLOGICAL MEASUREMENTS

(75) Inventors: Stefan Schmid, Heilsbronn (DE); Christof Donitzky, Eckental (DE)

(73) Assignee: Wavelight GmbH, Erlangen (DE)

( * ) Notice: Subject to any disclaimer, the term of this patent is extended or adjusted under 35 U.S.C. 154(b) by 4 days.

(21) Appl. No.: 12/989,008

(22) PCT Filed: Apr. 25, 2008

(86) PCT No.: PCT/EP2008/003382
§ 371 (c)(1),
(2), (4) Date: Jan. 21, 2011

(87) PCT Pub. No.: WO2009/129829
PCT Pub. Date: Oct. 29, 2009

(65) Prior Publication Data
US 2011/0134390 A1   Jun. 9, 2011

(51) Int. Cl.
*A61B 3/10* (2006.01)
*A61B 3/00* (2006.01)
(52) U.S. Cl.
USPC .......................................... 351/205; 351/203
(58) Field of Classification Search
USPC ......................................... 351/205, 200, 203
See application file for complete search history.

(56) References Cited

U.S. PATENT DOCUMENTS

| 5,713,893 A | 2/1998 | O'Donnell |
| 5,772,656 A | 6/1998 | Klopotek |
| 6,286,958 B1 | 9/2001 | Koest et al. |
| 7,066,598 B2 | 6/2006 | Niven |
| 7,226,163 B2 * | 6/2007 | Clark et al. ............... 351/159.62 |
| 2004/0189934 A1 | 9/2004 | Niven |
| 2008/0139082 A1 | 6/2008 | Schnuckle |

FOREIGN PATENT DOCUMENTS

| DE | 29913602 | 12/1999 |
| WO | WO 94/16425 | 7/1994 |

OTHER PUBLICATIONS

International Searching Authority/European Patent Office, "Notification of Transmittal of the International Search Report and the Written Opinion of the International Searching Authority, or the Declaration," for PCT/EP2008/003382, mailed Feb. 6, 2009, 8 pages.

\* cited by examiner

*Primary Examiner* — Jack Dinh
(74) *Attorney, Agent, or Firm* — Haynes and Boone, LLP

(57) ABSTRACT

An artificial eye model for use in ophthalmological measurements exhibits a simulation of at least one eye structure, for instance of a cornea or of a crystalline lens. In accordance with the invention the simulation possesses fluorescent properties. In this way, a beam expansion as a result of multiple scattering in the case of scattered-light-based photographic recordings can be avoided. Instead of this, a sharp-contour imaging of the simulated eye structures is made possible.

16 Claims, 1 Drawing Sheet

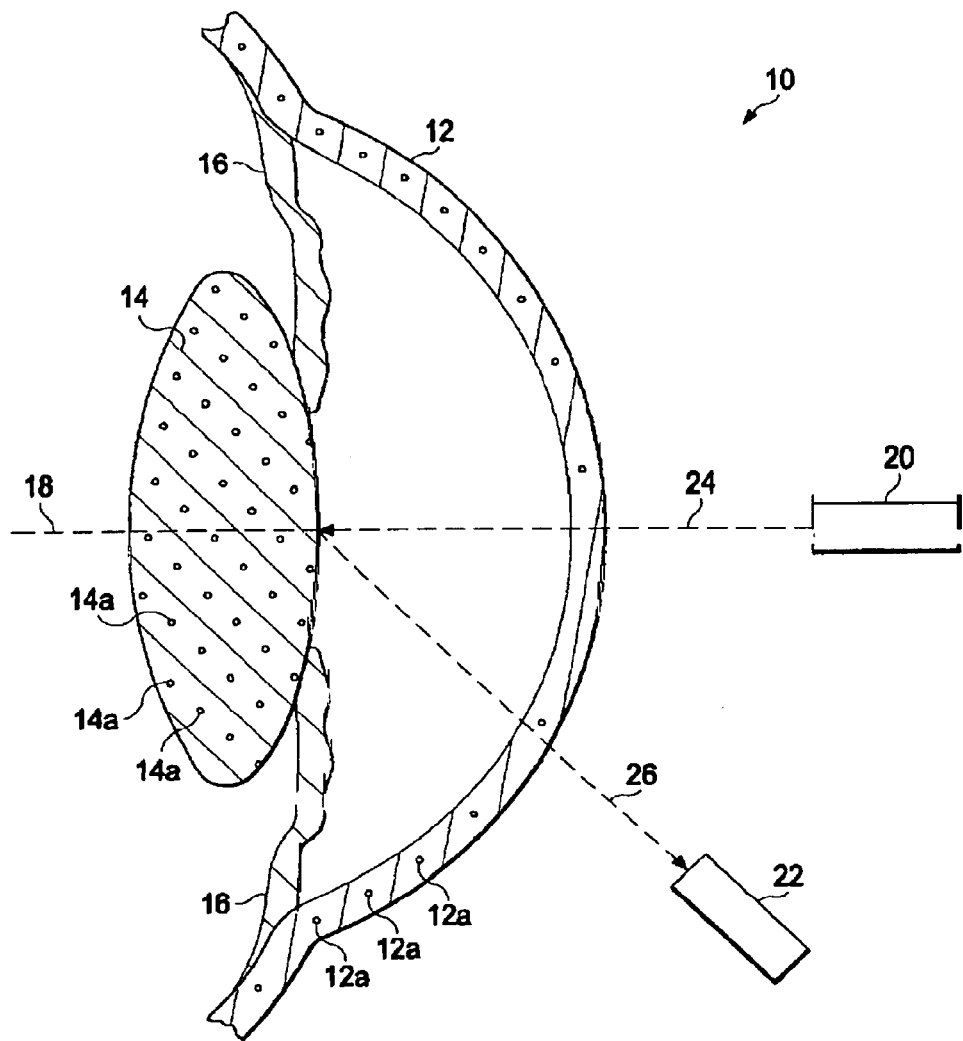

EYE MODEL FOR USE IN OPHTHALMOLOGICAL MEASUREMENTS

CROSS REFERENCE

This application was originally filed as Patent Cooperation Treaty Application Number PCT/EP2008/003382 on Apr. 25, 2008.

BACKGROUND

The invention relates to an eye model for use in ophthalmological measurements, with a simulation of at least one eye structure.

In a multitude of measuring methods with which properties of eyes are measured, electromagnetic radiation (for short in the following: light) is beamed onto and/or into the eye to be examined, and the radiation reflected back from the eye is detected and evaluated. In the radiation reflected back, the influence exerted on the light by the various elements of the eye is mirrored, for which reason by recording the radiation reflected back from the eye statements can be made about properties of the eye, for example about pathological changes. In a multitude of measuring techniques the radiation reflected back from the eye is recorded by means of a camera, in particular an electronic camera. An example of a camera-based system for examining the eye is the so-called Scheimpflug camera system, with which, in particular, the cornea and the crystal-line lens can be examined. As is known, Scheimpflug photography enables a sharp imaging of an object plane that is oblique in relation to the image plane of the camera system.

In ophthalmological Scheimpflug photography the eye is transilluminated in layer-like manner with a slit projector. In this process, light emerging from the eye as a result of scattering is photographed obliquely in relation to the optical axis of the incident light, cf. DE 299 13 602 U1. Light-section photographs generated in such a manner using the Scheimpflug technique frequently require checking by means of reference measurements. For the purpose of implementing these reference measurements, artificially simulated eye models can be called upon. In addition to use for comparison measurements or calibration measurements, such eye models, which simulate one or more eye structures, also find application in ophthalmological research and practice in connection with the development of new measuring techniques or instruments.

An exemplary eye model is known from U.S. Pat. No. 7,066,598 B2. The eye model therein exhibits, inter alia, simulations of the cornea and of the lens of a human eye. The simulations consist of an acrylic plastic that has been doped with scattering substances in order to imitate the scattering properties of the real prototypes.

However, it has been shown that the actual scattering behaviour of the eye can only be imitated inadequately in this way. This is associated with the fact that, although a doping of a plastic body simulating the cornea or the lens with pigments or other scattering substances has the result that a volume scattering of light takes place in the imitating body, the light is subject to multiple scattering at all scattering interfaces and scattering substances on which it impinges. The multiple scattering results in an expansion of the beam of scattered light, by reason of which interfaces and contours cannot be detected with the desired sharpness.

SUMMARY

In contrast, the invention is based on the finding that in the human eye the scattering of light at the interfaces and cell structures has a preferential direction. This is associated, in particular, with the fact that the individual cell layers within the lens and within the cornea run approximately parallel to the surface. Unlike in the case of translucent imitation materials with a homogeneous distribution of scattering substances, in the case of the human eye substantially only light from the immediately illuminated eye region is perceived as scattered light, i.e. no substantial expansion of the beam of scattered light takes place. This permits a sharp-contour photographic recording of the illuminated region.

In the light of the above finding, the idea of the invention is to implement examinations of an eye model not on the basis of scattered light but on the basis of fluorescent emissions. Accordingly, in an eye model according to the invention the simulation of an eye structure possesses fluorescent properties. In particular, the material of the simulation contains fluorophores that, upon excitation by an exciting radiation, emit light of a longer wavelength than the exciting radiation. On account of its longer wavelength, the emitted fluorescent light cannot excite any further fluorescent particles in the eye model to produce fluorescence. In the fluorescent light, therefore, the contours of the illuminated region stand out sharply. The blurred region to be observed in the case of scattered-light-based recordings on account of the multiple scattering can be avoided in the case of fluorescent-light photography.

The eye model may exhibit, in particular, a simulation of the cornea or/and a simulation of the lens, said simulation modelling the cornea or the human lens geometrically and containing fluorescent material. The vitreous body of the eye can also be simulated in the eye model. The fluorescent material may be homogeneously distributed in the simulation, so that in the entire volume of the simulation the same fluorescent properties appear. It is alternatively conceivable to distribute the fluorescent material inhomogeneously in the simulation of the eye structure in question. In this way, varying tissue layers within the cornea, within the lens or within another eye structure can be simulated. For example, the simulation may contain several regions of varying concentration of the fluorescent material, the fluorescent material expediently being substantially homogeneously distributed within each region. For instance, a cataract in the lens can be simulated. The background to this is the consideration that a varying concentration of the fluorescent material in the base material of the simulation results in a variably intense fluorescent emission. By way of base material of the simulation, use is preferentially made of a transparent material—that is to say, a material without substantial volume scattering. For example, a plastic material may be used for this purpose, for instance plexiglass (PMMA: poly(methyl methacrylate)). Fluorescent plexiglass bodies are commercially available in varying colours, for example in sheet form or rod form. Manufacture of the simulation(s) from such materials is readily possible.

It is, incidentally, also conceivable to change the concentration of the fluorescent material continuously in a simulated eye structure or at least in a portion thereof, so that the concentration or the progression of the concentration can be described by a gradient. Such a distribution of the fluorescent material may, in particular, be chosen for the purpose of simulating the human lens.

Alternatively or additionally to a variation of the concentration of the fluorescent material, fluorescent substances that emit fluorescent light of varying colour may be employed in the eye model. For example, it is conceivable to simulate the cornea by a first body that emits fluorescent light of a first colour, and to simulate the lens by a second body that emits fluorescent light of a second colour. Similarly, within a simulated eye structure it is conceivable to dope varying regions with fluorescent substances that emit varying colours. In this way, for example, various layers of the cornea (epithelium, stroma, etc.) or of the lens (capsule, cortex, nucleus, etc.) can be represented by different colours.

BRIEF DESCRIPTION OF THE DRAWING

FIG. 1 illustrates schematically an artificial eye model.

DETAILED DESCRIPTION

In the following an embodiment of a device for ophthalmological surveying of an eye model will be elucidated on the basis of the appended single FIGURE. Shown schematically therein is an artificial eye model 10 with a cornea simulation 12, a lens simulation 14 and an iris simulation 16. The anterior chamber of the eye located in the human eye between cornea and lens is preferentially likewise simulated in the eye model 10, for instance by being formed from a plastic material or a liquid. In each case the simulation of the anterior chamber of the eye should, like the natural anterior chamber of the eye, possess no scattering properties and should, in addition, possess no fluorescent properties.

On the other hand, in the eye model 10 both the cornea simulation 12 and the lens simulation 14 possess fluorescent properties. For this purpose the two simulations are formed from a transparent base material in which a fluorescent material has been embedded. For the purpose of representation, in the FIGURE the fluorescent material is indicated by punctiform particles which are denoted by 12a and 14a, respectively. For example, the cornea simulation 12 and the lens simulation 14 are produced from fluorescent plexiglass. The colours of the fluorescent emission of the cornea simulation 12 and of the lens simulation 14 may be different; for example, one of the two simulations could emit in the green wavelength region, whereas the other simulation emits in the yellow wavelength region. The fluorescent emissions of the two simulations 12, 14 may just as well have substantially the same colour.

The iris simulation 16 may, if required, likewise be formed from a material with fluorescent properties.

The optical axis of the eye model 10 is denoted by 18 in the FIGURE. The individual elements of the eye model 10 are substantially formed in rotationally symmetrical manner around the optical axis 18, as corresponds approximately to the natural eye. For an accurate geometrical simulation of the real eye, at least some of the simulated surfaces may be constructed with toric or aspherical curvature or even in multiply curved manner. Of course, alternatively or additionally, in the creation of the eye model and of individual eye structures working may proceed with spherically curved surfaces.

A slit projector 20 and also a Scheimpflug camera 22 serve for the photographic recording of the simulated eye structures, the Scheimpflug camera 22 preferentially being an electronic (digital) camera. The slit projector 20 directs, in a manner known as such, a slit beam 24 (a 'disc of light') along the optical axis 18 onto the eye model 10. The slit beam 24 consists, for example, of black light (UV light). On account of the transparency of the base material of the two simulated bodies 12, 14, the slit beam 24 pierces the cornea simulation 12 and the lens simulation 14 and in the process excites the fluorescent material 12a, 14a to produce fluorescent emission. The emitted fluorescent light comes out of the eye model 10 to the side, as indicated by an arrow 26, and is detected with the Scheimpflug camera 22. The Scheimpflug camera 22 may have been constructed with suitable filter means that are substantially transmitting only in respect of the fluorescence wavelength of the fluorescent material 12a, 14a, so that only the emitted fluorescent light falls on the image sensor of the Scheimpflug camera 22. Any possible scattered-light influences that are not based on fluorescent emission can be suppressed in this way, particularly if the exciting light emitted from the slit projector 20 contains wavelengths in the visible region.

In this way, the measuring device shown in the FIGURE is able to supply reference images of an eye which can be drawn upon for the purpose of calibrating and referencing the camera system—that is to say, in order to establish whether the system consisting of slit projector 20 and Scheimpflug camera 22 is really supplying correct images which correspond to the object to be surveyed. Furthermore, the image data obtained can be used for comparisons with images that are obtained in respect of the living eye.

The eye model 10 may also be employed for ophthalmological purposes other than Scheimpflug photography. For example, it may be used as a training object for slit-lamp examinations. It is also conceivable to introduce artificial cataracts into the lens simulation 14, for instance with strongly focused laser radiation of sufficient power, in order thereby to calibrate measuring instruments.

What is claimed is:

1. Eye model for use in ophthalmological measurements, the eye model comprising:
a simulation of at least one eye structure formed of a base material embedded with a fluorescent material such that said simulation emits light upon excitation by an exciting radiation.

2. Eye model according to claim 1, characterised in that the simulation models at least one of a cornea, a human lens, and a vitreous body geometrically.

3. Eye model according to claim 2, characterised in that the base material is a plastic material without substantial volume scattering.

4. Eye model according to one of claim 1, characterised in that the fluorescent material is inhomogeneously distributed in the simulation.

5. Eye model according to claim 4, characterised in that the simulation contains several regions of varying concentration of the fluorescent material, the fluorescent material being substantially homogeneously distributed within each region.

6. Eye model according to claim 4, characterised in that the simulation possesses at least one region in which the concentration of the fluorescent material is characterised by a gradient.

7. Device for ophthalmological surveying of an eye model according to claim 1, characterised by a source of the exciting radiation directed onto the eye model and by a camera for recording an image of the simulation from the emitted fluorescent light.

8. An artificial eye model, comprising:
at least one eye structure formed of an artificial material, wherein said artificial material includes a fluorescent material that reacts to an exciting radiation and emits fluorescent light.

9. The eye model of claim 8, wherein said fluorescent material is inhomogeneously distributed within said artificial material.

10. The eye model of claim 9, wherein said artificial material contains regions of varying concentration of said fluorescent material, the fluorescent material being substantially homogeneously distributed within at least one of the regions.

11. The eye model of claim 9, wherein a concentration of said fluorescent material in at least one region is characterised by a gradient.

12. The eye model of claim 11, wherein the at least one region characterized by the gradient simulates a human lens.

13. The artificial eye model of claim 8, wherein a first portion of the fluorescent material emits light of a first color and a second portion of the fluorescent material emits light of a second color, the second color being different than the first color.

14. The artificial eye model of claim 13, wherein the first color is in a green wavelength region and the second color is in a yellow wavelength region.

15. The artificial eye of claim 8, wherein the artificial material is transparent.

16. The artificial eye of claim 15, wherein the artificial material comprises plexiglass embedded with the fluorescent material.

\* \* \* \* \*